United States Patent
Coleman et al.

(10) Patent No.: US 7,653,749 B2
(45) Date of Patent: Jan. 26, 2010

(54) REMOTE PROTOCOL SUPPORT FOR COMMUNICATION OF LARGE OBJECTS IN ARBITRARY FORMAT

(75) Inventors: Paul L Coleman, Redmond, WA (US); Wilhelm Schmieder, Issaquah, WA (US); John Parsons, Sammamish, WA (US); Nadim Abdo, Bellevue, WA (US); Joy Chik, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 688 days.

(21) Appl. No.: 11/419,594

(22) Filed: May 22, 2006

(65) Prior Publication Data

US 2007/0046980 A1    Mar. 1, 2007

Related U.S. Application Data

(60) Provisional application No. 60/712,993, filed on Aug. 31, 2005.

(51) Int. Cl.
G06F 15/16    (2006.01)

(52) U.S. Cl. .................. 709/246; 709/224; 709/203
(58) Field of Classification Search ......... 709/246–247, 709/231, 236, 224, 203
See application file for complete search history.

(56) References Cited

U.S. PATENT DOCUMENTS

| 6,292,554 | B1 * | 9/2001 | Oden et al. ............... 379/229 |
| 7,171,483 | B2 * | 1/2007 | Klein ...................... 709/224 |
| 2002/0016818 | A1 * | 2/2002 | Kirani et al. ............. 709/203 |
| 2003/0069963 | A1 * | 4/2003 | Jayant et al. ............. 709/224 |
| 2003/0110234 | A1 * | 6/2003 | Egli et al. ................ 709/217 |
| 2005/0182792 | A1 * | 8/2005 | Israel et al. ............. 707/104.1 |

* cited by examiner

Primary Examiner—Philip B Tran
(74) Attorney, Agent, or Firm—Lee & Hayes, PLLC

(57) ABSTRACT

A server computer provides objects such as bitmaps representing graphics image for processing by a client computer or device. The object may be of any arbitrary size or format, and is converted to a data structure that can be received by the client computer. Synchronized metadata may be included in the data structure, where such metadata data is used by an application in the client computer or device.

19 Claims, 4 Drawing Sheets

REMOTE PROTOCOL SUPPORT FOR COMMUNICATION OF LARGE OBJECTS IN ARBITRARY FORMAT

RELATED APPLICATIONS

The present application claims priority under 35 U.S.C. §119(e) to U.S. Provisional Application No. 60/712,993, filed Aug. 31, 2005, the disclosure of which is incorporated herein.

BACKGROUND

An application program or application may create and provide a graphics image. The graphics image may be represented by a bitmap which can be passed on to other applications. Since graphics images can vary in complexity or size, the bitmaps representing graphics images can also vary in complexity or size.

In a server and remote client system, where a server computer supports one or more client computers, a bitmap from the server computer may be broken down into smaller pieces and communicated to the client computer. The client computer may individually display or process each of the smaller bitmap pieces. In other words, to display the larger graphics image, each of the smaller bitmap pieces is processed. A problem for relatively large size bitmaps that are changing or updating at a high rate is a tearing effect seen at the client computer. The tearing effect takes place as the client computer displays each bitmap piece.

If the bitmap is sent at one time (i.e., not broken into the smaller pieces) to the client computer, the client computer may decide how the bitmap may be displayed giving specific constraints (e.g., high update rate) seen at the client computer; however, if the bitmap is sent in its entirety, it may have to be compressed. Compression typically is used to support relatively large size bitmaps. An application running at the server computer may compress the bitmap based on a particular compression format. The compression formats may be lossy, meaning that some information or data is degraded or lost when a bitmap (i.e., graphics image) is compressed.

The bitmap may be communicated or transmitted to the client computer using a particular communication protocol such as Remote Desktop Protocol or RDP. Typically when a communication protocol is used, the compressed bitmap is further decompressed into a standardized uncompressed format to allow a communication protocol encoder to compress the bitmap for transmission to the client computer. This may involve significant and redundant work for the server computer and result in lower compression ratios than were already present in the pre-compressed bitmap (i.e., further degradation of the original bitmap).

Furthermore, when a communication protocol, such as RDP, is implemented, a separate channel or virtual channel may be implemented to provide metadata information related to the bitmap or bitmaps. This separate or virtual channel typically is not synchronous with the bitmaps or graphics stream that includes the bitmaps. It is typical that the bitmaps or the graphics stream, are transmitted over a channel separate from the virtual channel in which metadata is transmitted. This can be a limitation in scenarios where synchronizing the graphics stream with some metadata is desired or required. A specific example of such a limitation with RDP is the lack of information at the client side about window positions and dimensions. If the display of the graphics stream was to be directly affected by window placement, it might be important for changes in window placement to be carefully synchronized with the graphics stream.

In addition, the reassembly of arbitrarily large objects at the client side creates a memory management issue at the client computer. For example, as bitmaps and/or bitmap pieces are received by a client computer, they may be placed in a buffer, then reassembled and processed. However, the buffer at the client computer may not be sufficiently large enough to accommodate the bitmaps and/or bitmap pieces.

SUMMARY

A method and apparatus is provided that enables a client computer or device of server-client system to provide information to server computer as to the ability to receive a bitmap or other object, structuring the object so it may be received by the client computer, and adding client computer application metadata to the data representing the bitmap or object.

This Summary is provided to introduce a selection of concepts in a simplified form that are her described below in the Detailed Description. This Summary is not intended to identify key features or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
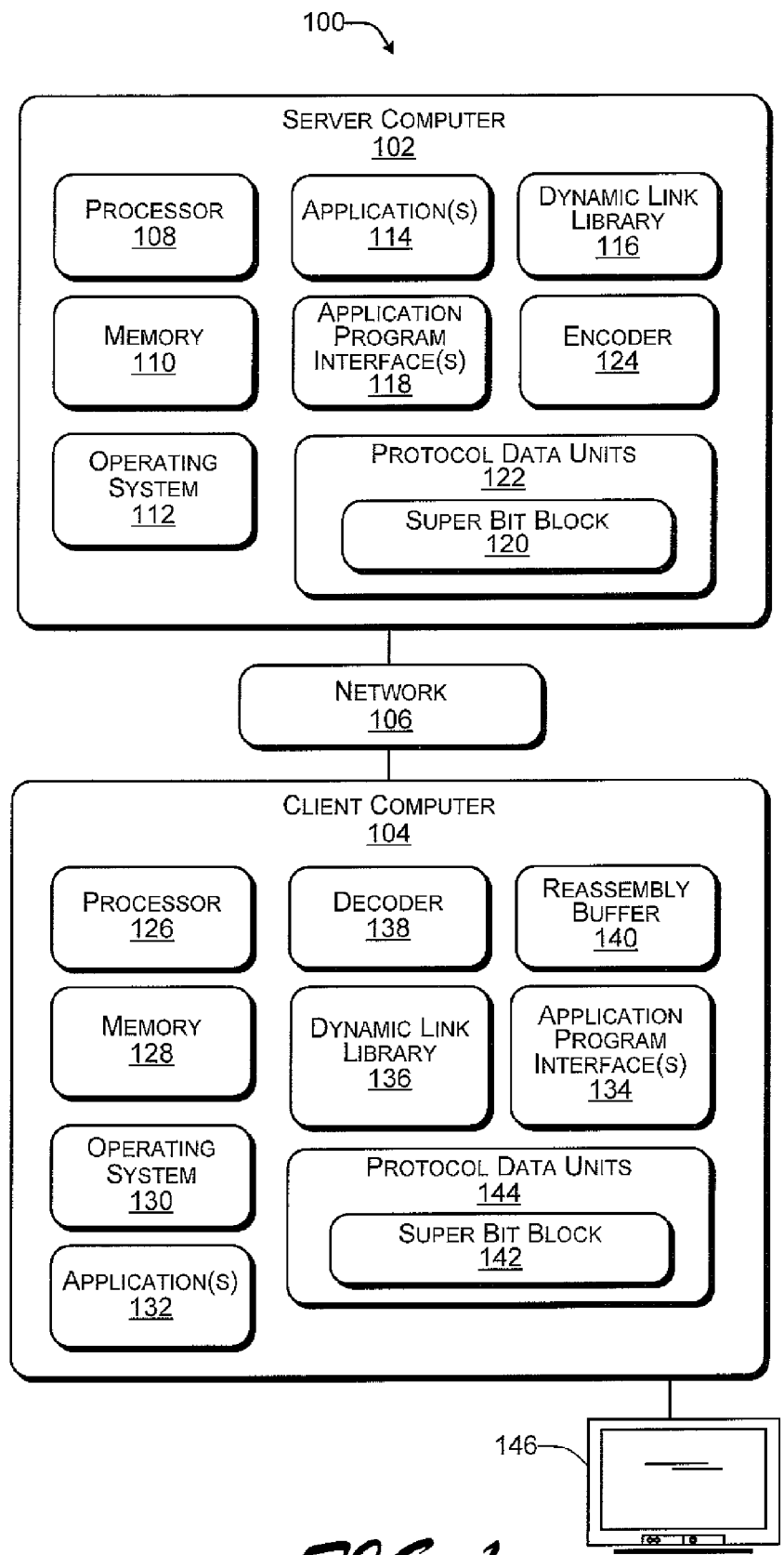
FIG. 1 is an illustration of an—server-client system that incorporates protocols and application programming interfaces (API) that allow a client computer to reassemble fragments of large objects.

FIG. 1 shows an exemplary server and remote client or server-client system 100. The system 100 includes a server computer 102 and one or more client devices or client computers as represented by client computer 104. Server computer 102 and client computer 104 are connected by a network 106 which may include one or more networks, including the Internet. In particular, graphics images, objects, and/or bitmaps representing graphics images, are sent from server computer 102 to client computer 104 for processing or display by client computer 104. The graphics images, objects, and/or bitmaps may be of any arbitrary size. The graphics images, objects, and/or bitmaps may be communicated by server computer 102 using a communication protocol such as Remote Desktop Protocol or RDP. A transport protocol such as transmission control protocol over Internet protocol (TCP/IP) may be implemented when transporting over network 106. In certain cases, when RDP is implemented, server computer 102 may be referred to as an "RDP server" and client computer 104 may be referred to as an "RDP client".

Any metadata describing or associated with the graphics images, objects, and/or bitmaps may be included with the graphics images, objects, and/or bitmaps as they are communicated from server computer 102. This allows the metadata to be synchronized with the graphics images, objects, and/or bitmaps. Although a server-client system 100 is described in this example, it is contemplated that other implementations such as intra device systems (e.g., stand alone computing devices) may make use of the techniques and methods described herein.

Server computer 102 includes a central processing unit, or one or more processors as represented by processor 108. Processor 108 may control or access a storage device or a memory 110. In this exemplary implementation, server computer 102 further includes an operating system 112 which may reside in memory 110. The server computer 102 includes one or more application programs or application(s) 114 that are controlled by the processor 108. In particular, applications 114 include applications that generate or provide the graphics images, objects, and/or bitmaps that are communicated to client computer 104.

A dynamic link library or DLL 116 is included with server computer 102. In particular, the DLL 116 includes routines accessed through application program interface(s) 118 that allow application(s) 114 to pass the graphics images, objects, and/or bitmaps. Examples of such routines include a "DrvEscape" call from a user mode (e.g., application level) into a display driver "rdpdd.dll" (the display driver typically is in kernel/operating system mode or level) to pass an arbitrary encoded bitmap to be re-encoded as a particular protocol data unit or PDU, referred to in this example as a "SuperBlt" or super bit block 120, which is eventually passed on or communicated to the client computer 104. It is expected that graphics images, objects, and/or bitmaps that are passed through the application program interface(s) 118 may be in any arbitrary format including formats that support per pixel alpha-transparency information. This is an exemplary implementation, in which metadata may be sent to client computer 104 such that the metadata is synchronized with a graphics stream, where the bitmaps may come through standard calls such as through a "Win32" graphics stream, by using known and existing "BitBlt" routines.

The super bit block 120 is a single PDU that is split into multiple data blocks by lower layers in a communication protocol, such as remote desktop protocol or RDP. In certain implementations, super bit block 120 is part of other protocol data units 122. An encoder 124 may be implemented to compress and package the super bit block 120 into a packet or graphics stream, where the packet and/or graphics stream is sent over a single channel. In particular, the encoder 124 is configured to implement a specific communication protocol such as RDP, and/or transmission protocols such as TCP/IP. In other implementations, separate components may be used to provide the functions of the encoder 124. In certain cases, the encoder 124 or other component at the server computer 102 may break down any graphics images, objects, and/or bitmaps that are too large into smaller and more manageable graphics images, objects, and/or bitmaps. The smaller graphics images, objects, and/or bitmaps are then reassembled at the client computer 104.

Client computer 104 includes a central processing unit, or one or more processors as represented by processor 126. Processor 126 may control or access a storage device or a memory 128. In this exemplary implementation, client computer 104 further includes an operating system 130 which may reside in memory 128. The client computer 104 includes one or more application programs or application(s) 132 controlled by processor 126. In particular, application(s) 132 include applications that process graphics images, objects, and/or bitmaps received from server computer 102. In specific, the graphics images, objects and/or bitmaps are received by applications 132 through applications program interfaces(s) 134 which access routines or drivers in a dynamic link library (DLL) 136. A specific application program interface may be a "bit block" type interface based on preexisting "bit block" conventions and protocols, where such an interface is used to pass reassembled bitmap data (i.e., graphics images, objects, bitmaps) along with corresponding metadata, to application(s) 132. The routines or drivers of dynamic link library 136 are particularly used to pass the graphics data or information from applications 132 to the operating system 130.

The client computer 104 includes a decoder 138. Decoder 138 may decompress received PDUs, such as super bit blocks (i.e., graphics images, objects, and/or bitmaps) which may or may not be in a data or graphics stream. Other functions of decoder 138 may include decoding the received graphics images, objects, and/or bitmaps based on a particular communication protocol (e.g., RDP) and/or transmission protocol (e.g., TCP/IP).

In specific cases a received object such as a super bit block may be treated as a stream instead of a discrete object that is reassembled at the client computer 104. In an exemplary implementation, the decoder 138 may be used to keep track of decode state of a data stream or graphics stream that includes the super bit block 120 that describes the graphics images, objects, and/or bitmaps. By tracking the decode state of the graphics stream, the graphics stream may be interrupted, and client computer 104 is made aware where to continue when interruption occurred. A specific implementation is to provide the decoder 138 as a state machine which explicitly stores context of received data (e.g., super bit blocks in the graphics stream). In another implementation, the decoder 138 runs on a separate thread to server computer 102, such that decoder 138 reads from the graphics stream. When the decoder 138 needs to wait for more data (e.g. super bit blocks), the decoder 138 is "suspended". When suspended, the state of the decoder 138 is implicitly saved on a thread stack of the separate thread from which the decoder 138 runs. In other words, the state of the decoder 138 is implicitly held on a stack of a decoder thread while the decoder 138 is suspended such that the decoder 138 knows where to continue when it becomes unblocked (i.e., not suspended).

A reassembly buffer 140 may be included in client computer 104. The reassembly buffer 140 particularly stores smaller pieces of a super bit block (i.e., graphics images, objects, and/or bitmaps) prior to passing an application program interface in application interface(s) 134. In particular implementations wherein the super bit block is not broken up into smaller pieces, the reassembly buffer 140 is not included in client computer 104. In certain implementations, a separate buffer (not shown) may be used to temporary store super bit blocks (i.e., graphics images, objects, and/or bitmaps) before further processing by the client computer 104.

As discussed above, client computer 104 may implement a communication protocol, such as RDP, and may be referred to as an RDP client, As an RDP client, client computer 104 receives through an application program interface, a super bit block 142 that includes a set of protocol data units 144. Furthermore, the super bit block 142 that is split into multiple data blocks. The super bit block 142 may be included with other protocol data units 144. The data in super bit block 142, which includes data describing a particular graphics image, object, or bitmap, may be used by the application(s) 132 to generate or render a graphics image on a display 146.

Figure 2:
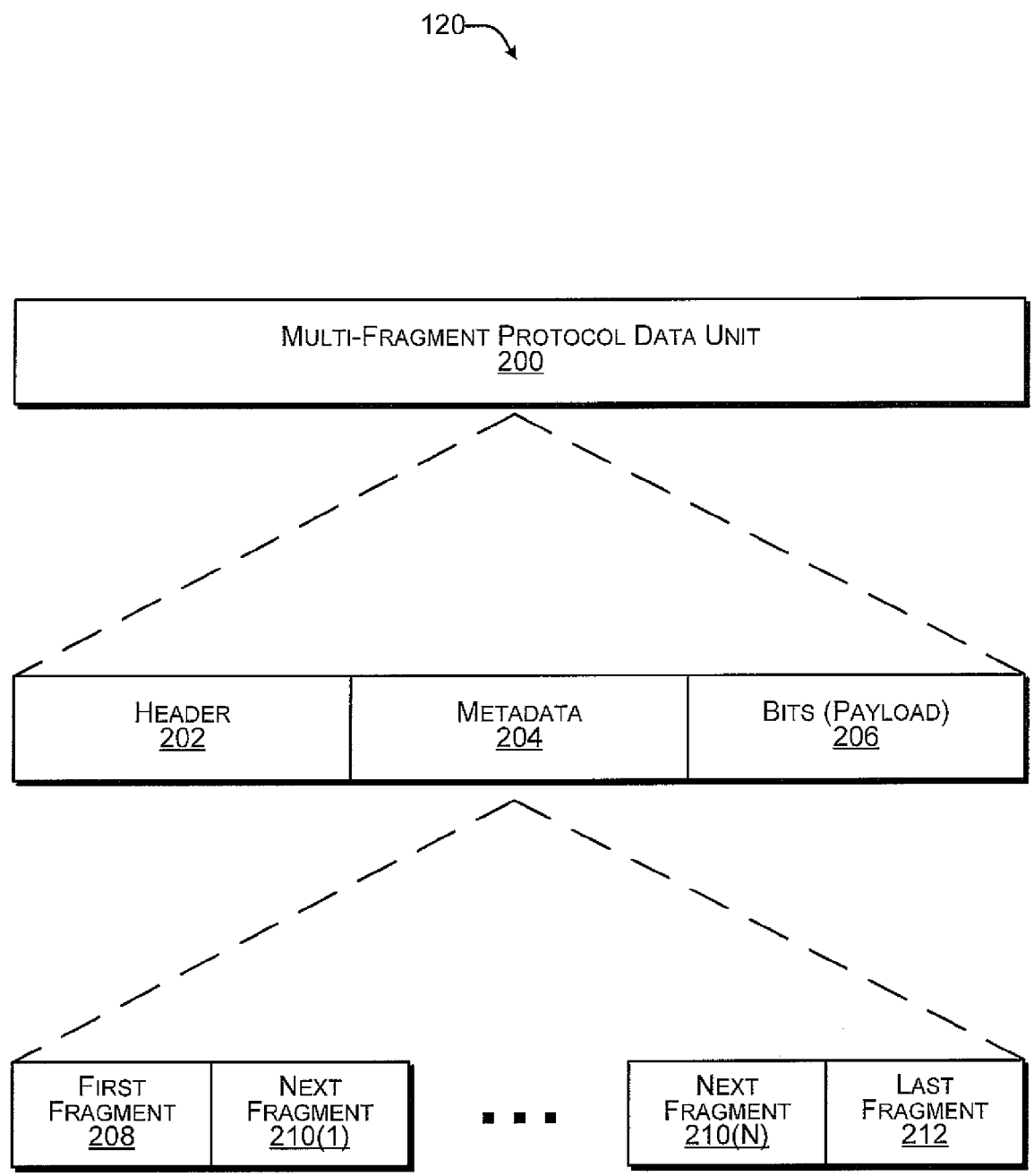
FIG. 2 is an illustration of an exemplary data block structure of a multi-fragment protocol data unit.

FIG. 2 shows an exemplary data block structure of a multi-fragment PDU 200. The super bit block 120 described above is particularly implemented by the multi-fragment PDU 200.

The multi-fragment PDU 200 may be of any specific size; however, compression may be needed to support the multi-fragment PDU 200, if resources (e.g., receiving buffers) at the client computer 104 are limited. In such cases, the client computer 104 may inform the server computer 102 as to specific size limitations. As an example, the multi-fragment PDU 200 may originally be 1 or 2 MB in size, and the client computer 104 may only support 64 KB. An implementation may involve breaking down the super bit block 120 or multi-fragment PDU 200 into smaller pieces. In another implementation, the entire super bit block 120 or multi-fragment PDU 200 is sent where selective data of the super bit block 120 or multi-fragment PDU 200 is compressed and effectively decreasing the size of the entire super bit block 120 or multi-fragment PDU 200.

The multi-fragment PDU 200 may include a header 202, metadata 204, and payload or bits 206. The header 202 may include information as to the bitmap (or graphics image or object), such as color depth and compression type. Furthermore, the header 202 may describe the size of the succeeding metadata 204 and the bits 206. In certain cases, the super bit block 120 or multi-fragment PDU 200 may be conveyed or communicated from the server computer 102 with just metadata 204 information (i.e., payload 206 is not sent or is empty). The metadata 204 may include any additional information directed to the information in the payload 206. The information in metadata 204 is particularly directed to be application level data used by applications(s) 132 of client computer 104. By providing the metadata 204 with the payload 206, the metadata is synchronized with the payload 206. As an example, synchronization of metadata is particularly beneficial in synchronizing audio with display actions and associating timing information to improve quality of steady frame-rate video.

The multi-fragment PDU 200 may be split up into multiple fragments, as represented by a first fragment 208, next fragments 210, and a last fragment 212. RDP protocol provides an update PDU mechanism. In this example, the update PDU mechanism is extended to support multi-fragment PDUs, such as multi-fragment PDU 200, which include first fragment 208, next fragments 210, and last fragment 212. In particular, a communication protocol, such as RDP, through lower layers of the protocol, is able to split up the multi-fragment PDU into multiple data blocks or fragments such as first fragment 208, next fragments 210, and last fragment 212.

The multi-fragment PDU 200 may be used to send any resource, such as a bitmap. In other words, multi-fragment PDU 200 is not limited to any specific object type. By providing multiple fragments 208, 210, and 212 that are identified with "first, next, and last", a layer of a decoder (e.g., decoder 138) knows whether additional fragments are to be received before passing data to an upper layer of the decoder, where the upper layer of the decoder has knowledge as to the actual resource or object type in the PDU or multi-fragment PDU 200.

Figure 3:
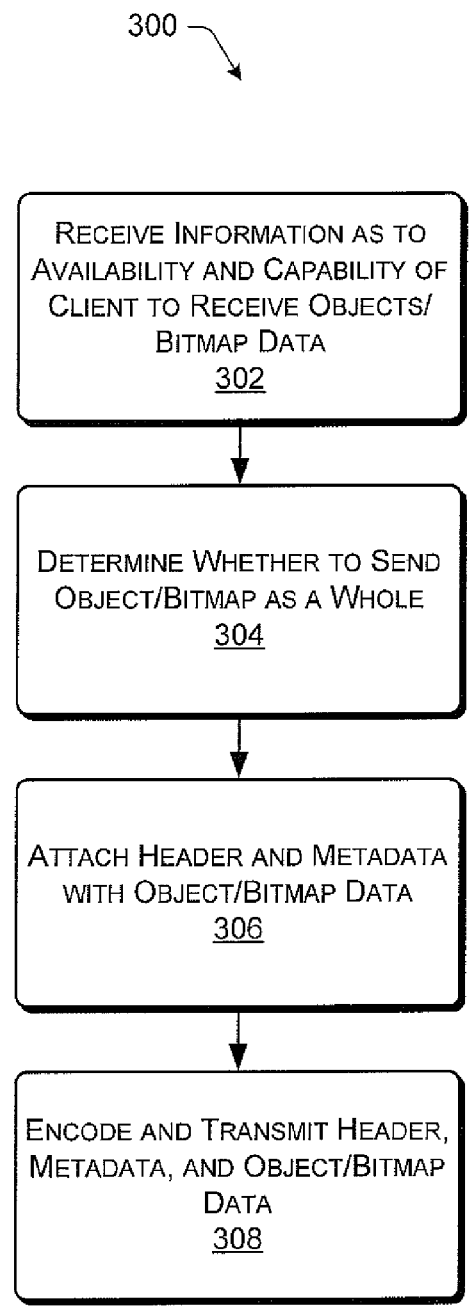
FIG. 3 is a flowchart illustrating a process for sending application level metadata synchronized with a data stream.

FIG. 3 shows a process 300 that sends application level metadata that is synchronized with a data stream. The process 300 may be implemented as a protocol between a server computer (e.g., server computer 102) and a client computer (e.g. client computer 104). The process 300 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain blocks may take place concurrently or in a different order.

At block 302, a server computer receives information as to the availability of one or more client computers (devices) to receive object or bitmap data that may describe or be associated with a graphics image. For example, the object may be represented as a multi-fragment PDU (e.g., multi-fragment PDU 200). The graphics image may be provided by an application or application program running at the server computer. In addition to the availability of the client computer or computers, the server computer may receive information as to the resource capabilities of specific client computers. The resource capabilities may include buffer capacities at the client computer, including receiving buffers and reassembly buffers. The information may he conveyed through a channel in which data is sent from the server computer to the client computers, or a separate channel.

At block 304, a determination is made at the server computer whether to send the object or bitmap, or data (e.g. multi-fragment PDU) that represents the object or bitmap, as a whole. A factor in the determination is the resource capabilities of the client computer. Alternatively, the object or bitmap (data) may be broken up into smaller pieces. The smaller pieces are eventually received and reassembled by the client computer. The determining or determination may be based on the resource capabilities of the client computer.

At block 306, header and metadata information may be added with object or bitmap data. The metadata is particularly directed to be used by an application or applications resident at the client computer, where such application or applications consume or process the object or bitmap data. The metadata may further describe or provide additional information as to the object or bitmap data. The object may be represented by the multi-fragment PDU which may include multiple fragments as described in FIG. 2 above. In particular, the multiple fragments may be sequenced and include an identifier with each fragment as to where in the sequence a particular fragment is located (e.g., first, next, and last).

At block 308, the header, metadata, and object or bitmap data may be structured into a particular data format such as the multi-fragment PDU described in FIG. 2, and sent to client computers. The header, metadata, and object or bitmap data (i.e., multi-fragment PDU or super bit block) may be further compressed and encoded based on a particular communication protocol such as RDP, and/or a particular transmission protocol such as TCP/IP. Discrete multi-fragment PDUs or super bit blocks may be included in or be part of a data stream that is communicated intra-device (i.e., within the same machine), such that there is a producer (i.e., application) of the data stream and a consumer (i.e. application) of the data stream.

Figure 4:
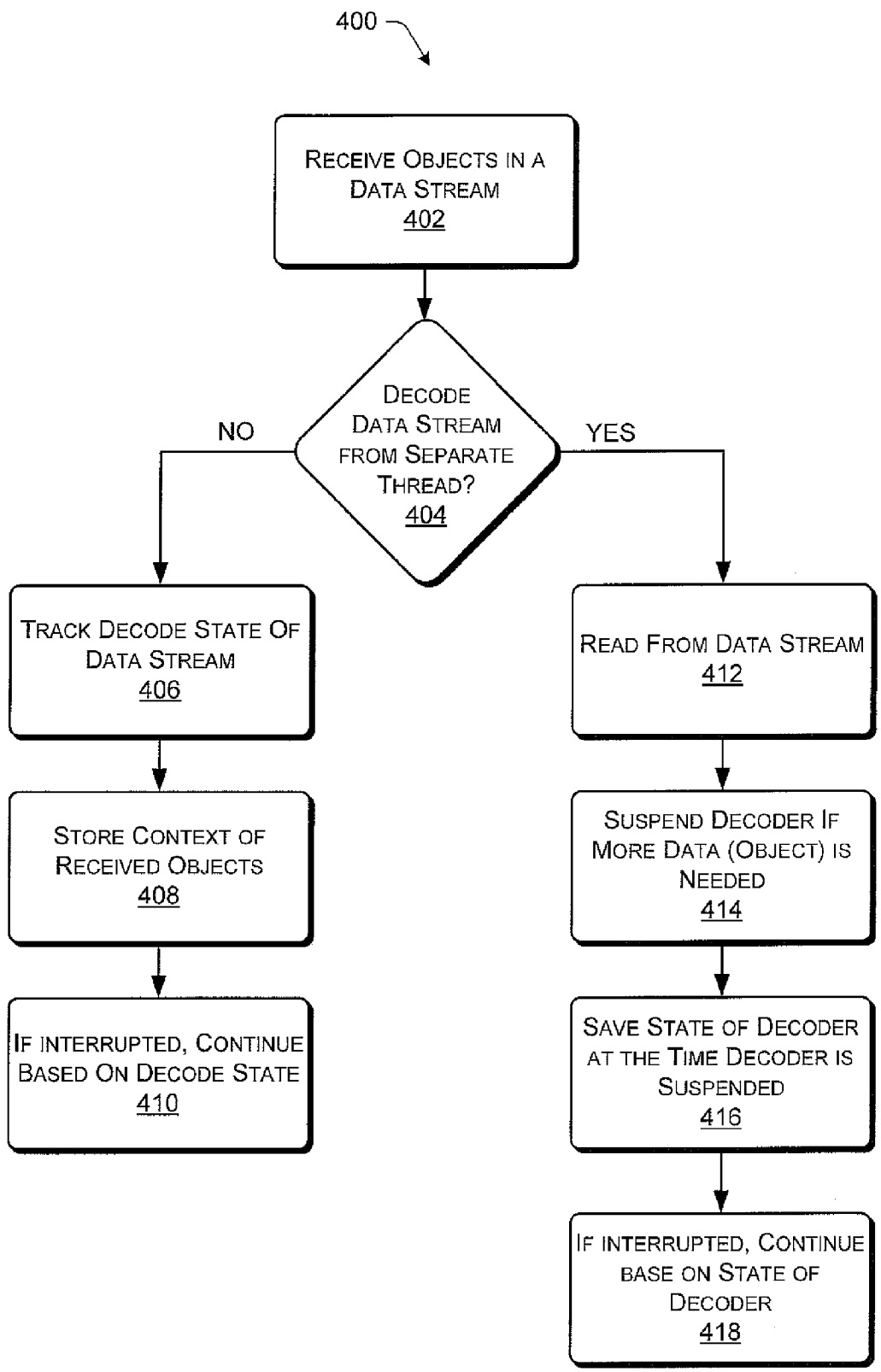
FIG. 4 is a flowchart illustrating a process for treating an incoming large object as part of a data stream.

FIG. 4 shows a process 400 that treats an incoming large object as a data stream. Process 400 is particularly directed to managing large objects such as bitmaps at a client computer (e.g., client computer 104). The process 400 may be implemented at the client computer as it receives objects such as a super bit block. The process 400 is illustrated as a collection of blocks in a logical flow graph, which represent a sequence of operations that can be implemented in hardware, software, firmware, or a combination thereof. In the context of software, the blocks represent computer instructions that, when executed by one or more processors, perform the recited operations. Although described as a flowchart, it is contemplated that certain blocks may take place concurrently or in a different order.

At block 402, a client computer receives objects, such as super bit blocks, in a graphics or data stream. The data stream may originate from a server computer and be transmitted over one or more networks, as described by the exemplary system 100 as shown FIG. 1. The data stream may be sent through a particular thread or channel.

A decoder or similar component at the client computer may receive and process the objects in the data stream. If the decoder does not receive the data stream in a separate thread from the thread in which the data stream is communicated or sent (i.e., following the "NO" branch of block 404), for a particular implementation, at block 406, the decoder may track the decode state of the data stream, and particularly the decode state of objects in the data stream.

At block 408, the decoder acting as a state machine may store context or decode state of received objects in the data stream. At block 410, if the data stream is interrupted (i.e., decoder stops receiving the data stream), then decoding may continue based on the decode state of the received objects.

If the decoder runs on a separate thread from which the data stream is received (i.e., following the "YES" branch of block 404), in another implementation, at block 412, the decoder reads from the data steam on the separate thread.

At block 414, if more or additional data/objects in the data stream are needed by the decoder, the decoder is suspended. At block 416, the state of the decoder is saved. In particular, if the decoder runs on a separate thread, the thread stack of the separate thread implicitly saves the state of the decoder when the decoder is suspended. At block 418, decoding may continue based on the state of the decoder (e.g., state on thread stack), when interruption occurred.

CONCLUSION

The above-described methods and devices describe communicating arbitrary sized objects such as bitmaps of a graphics image to a client device for processing. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented on a computing device by a processor configured to execute instructions that, when executed by the processor, direct the computing device to perform acts comprising:
   receiving information as to capability of a client device to receive an object from a server computer;
   determining whether to break up the object or send the object as a whole to the client device based at least on the capability of the client device;
   adding metadata to the object, wherein the metadata is used by an application resident at the client device to process the object;
   structuring the object and metadata into a particular data format;
   fragmenting the particular data format to create at least one or more fragmentations that are identified by at least one or more identifiers; and
   sending the fragmented particular data format in a sequence order to the client device, wherein the identifier is used to locate the fragmentation in the sequence order.

2. The method of claim 1, wherein the object describes a bitmap representative of a graphics image.

3. The method of claim 1, wherein the receiving information comprises resource capabilities including receiving buffers and reassembly buffers capacity of the client device.

4. The method of claim 1, wherein the receiving information is through a channel that is separate from a channel in which the sending is performed.

5. The method of claim 1, wherein the determining is based on resource capabilities of the client device.

6. The method of claim 1, wherein the adding further comprises adding a header that describes the object.

7. The method of claim 1, wherein the sending further comprises packaging and compressing the object.

8. The method of claim 1, wherein the sending is through a data stream that includes the object.

9. The method of claim 1, wherein the sequence order is performed by a communication protocol.

10. A computing device comprising:
    a memory component;
    an operating system; and
    a processor that is configured to:
    receive information as to capability of a client device to receive an object from a server computer;
    determine whether to break up the object or send the object as a whole to the client device based at least on the capability of the client device;
    add metadata to the object, wherein the metadata is used by an application resident at the client device to process the object;
    structure the object and metadata into a particular data format;
    fragment the particular data format to create at least one or more fragments of the particular data format that are identified by at least one or more identifiers; and
    send the fragmented particular data format in a sequence order to the client device, wherein the identifier is used to locate the fragmentation in the sequence order.

11. The computing device of claim 10, wherein the capability of the client device includes receiving buffers and reassembly buffers capacity of the client device.

12. The computing device of claim 10, wherein the objects are bitmaps representing graphics image.

13. The computing device of claim 10, wherein the fragmenting of the particular data format is based upon resource capability of the client device.

14. The computing device of claim 10, wherein the sequence order is performed by a communication protocol.

15. A computer-readable storage media having computer-readable instructions thereon which, when executed by a computer, implement a method comprising:
    receiving information as to capability of a client device to receive an object from a server computer;
    determining whether to break up the object or send the object as a whole to the client device based at least on the capability of the client device;
    adding metadata to the object, wherein the metadata is used by an application resident at the client device to process the object;
    structuring the object and metadata into a particular data format;
    fragmenting the particular data format to create at least one or more fragments of the particular data format that are identified by at least one or more identifiers; and sending the fragmented particular data format in a sequence order to the client device, wherein the identifier is used to locate the fragmentation in the sequence order.

16. The computer-readable storage media of claim 15, wherein the receiving information further includes availability of the client device to receive the object.

17. The computer-readable storage media of claim 15, wherein the metadata is synchronized with the object.

18. The computer-readable storage media of claim 15, wherein the object describes a graphics image that is represented by a bitmap of any arbitrary size.

19. The computer-readable storage media of claim 15, wherein the sequence order is performed by a communication protocol.

* * * * *